United States Patent [19]

Hayden, Sr.

[11] Patent Number: 5,603,252
[45] Date of Patent: Feb. 18, 1997

[54] SAW BLADE

[75] Inventor: Robert C. Hayden, Sr., Branford, Conn.

[73] Assignee: Sandvik AB, Sandviken, Sweden

[21] Appl. No.: 519,942

[22] Filed: Aug. 28, 1995

[51] Int. Cl.$^6$ ....................................................... B27B 33/02
[52] U.S. Cl. .............................................. 83/851; 83/835
[58] Field of Search ............................. 83/846, 851, 835, 83/852; 93/850

[56] References Cited

U.S. PATENT DOCUMENTS

| | | | |
|---|---|---|---|
| Re. 31,433 | 11/1983 | Clark | 83/846 |
| 2,568,870 | 9/1951 | Ronan | 83/846 |
| 4,557,172 | 12/1985 | Yoneda | 83/850 |
| 4,727,788 | 3/1988 | Yoshida et al. . | |
| 4,813,324 | 3/1989 | Yoshida et al. | 83/851 |
| 4,827,822 | 5/1989 | Yoshida et al. . | |
| 4,958,546 | 9/1990 | Yoshida et al. . | |
| 5,331,876 | 7/1994 | Hayden, Sr. | 83/851 |
| 5,410,935 | 5/1995 | Holston et al. | 83/835 |

FOREIGN PATENT DOCUMENTS 3741709  6/1989  Germany .................................. 83/835

*Primary Examiner*—Kenneth E. Peterson
*Assistant Examiner*—Sean A. Pryor
*Attorney, Agent, or Firm*—Burns, Doane, Swecker & Mathis, L.L.P.

[57] ABSTRACT

A saw blade is provided with recurring groups of teeth. Each group of teeth includes one straight tooth, an even number of high set teeth, and an even number of low set teeth. Distances from all of the teeth in the group to a corresponding, immediately preceding teeth are different for all of the teeth. Distances from all of the teeth in the group to a preceding tooth of the same height are different for each tooth. Distances from all of the set teeth in the group to the nearest preceding set tooth with the same set are different for each set tooth. No high teeth are immediately adjacent.

18 Claims, 1 Drawing Sheet

SAW BLADE

BACKGROUND AND SUMMARY

Certain saw blades, such as bandsaw blades, are commonly made with recurring variations in the shape, spacing, height, and setting of the teeth, as well as in the width of the saw blade body. By "setting" or "set" it is meant that certain teeth or portions of certain teeth slant to the left or right of a centerline of the blade. Most of these variations serve to improve the properties of the blade for certain specific applications. However, the same variations often decrease the usefulness of the blade for other applications.

Bandsawing, especially bandsawing metal, presents problems not commonly encountered in other sawing methods. The bandsaw blade is usually made thin and narrow, which limits the total feed force that can be applied to force the teeth into the sawn material and makes the blade very flexible. To get a smooth cut, several teeth must be actively engaged in cutting simultaneously, which allows only a relatively small feed force for each of the teeth. Small feed force leads to small cutting depth which, especially for tough materials, means unstable chip formation and excessive wear. Further, the fewer the number of teeth that are actively engaged in cutting simultaneously, the greater the effect of the sudden change in tension when a tooth leaves or enters the cut, and problems associated with self-induced vibrations of the saw blade vertically, laterally, or torsionally may occur. For example, such vibrations tend to lead to uneven cut surfaces and noise.

Variations in tooth shape, especially edge shape, may serve to make the teeth cut several narrow and thick chips rather than fewer thin and wide chips. Formation of numerous narrow and thick chips leads to less wear, less friction against the cut sides, and, usually, better lateral stability than formation of fewer thin and wide chips. However, many blades having teeth with variations in shape require extra manufacturing operations and are, in consequence, expensive to make, or if desired, to resharpen.

Variations in tooth spacing can lower the tendency of self-induced chatter vibrations when sawing thick material, and tends to minimize noise from the sawing operation. There is, however, a tendency for teeth with variations in spacing to become unevenly worn, which may later contribute to transverse forces and crooked cutting.

Tooth height may be varied in various ways to serve different purposes. If straight teeth are longer than others, their side faces tend to guide the blade and produce a straight and narrow cut. However, straight teeth are unlikely to straighten a cut if it starts to veer to one side. If high straight teeth are combined with teeth having variations in setting, multiple narrow thick chips will be cut instead of fewer thin wide chips. This tends to improve the sawing of tough materials, but may leave uneven sides of the cut since only those few teeth set to maximum width shape the final cut surface. In tough material, the combination of high straight teeth and teeth with variations in setting may also be used at slow feed rates so that the high teeth perform the bulk of the actual cutting operation, thus minimizing unstable conditions at small cutting depths. In more easily cut materials, higher feed rates can be used so that the high straight teeth and the teeth with variations in setting are all engaged in cutting. Thus, such a blade is useful for a variety of materials, albeit with a risk of premature wear of the high teeth if much of the work is with tough materials.

It is an object of the present invention to provide a saw blade that may be used for cutting a great variety of materials. It is also an object of the present invention to provide a saw blade that is subject to only limited premature wear. It is also an object of the present invention to provide a tooth setting pattern that is able to produce very smooth cut surfaces.

According to one aspect of the present invention, a saw blade includes a plurality of recurring groups of teeth, each tooth having a point. Each group comprises one high straight tooth without set, an even number of high set teeth with points at a first level, half of the high set teeth being set to the right and half to the left, an even number, greater than the number of high set teeth, of low set teeth with points at a second level lower than the first level, half of the low set teeth being set to the right and half to the left. Points of each tooth in the group are at a different distance from a point of a corresponding, immediately preceding tooth. All set teeth in the group have the same amount of set. No high tooth is immediately preceded by another high tooth. There are an odd number of low teeth between a high straight tooth and a high set tooth, and there are an even number of low teeth between two set high teeth. Distances from a point of any tooth in the group to a point of a preceding tooth of the same height are different for all teeth in the group. Distances from a point of any set tooth in the group to a point of a preceding set tooth of the same set are different for all set teeth in the group.

Improvements in vibration and stability available with the saw blade according to the present invention are most pronounced in metal bandsaws, where the feed force of the saw blade is high in relation to the blade tension, however, the present invention is also applicable to other types of saw blades, such as hand hacksaws, wood bandsaws, and bow saws.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
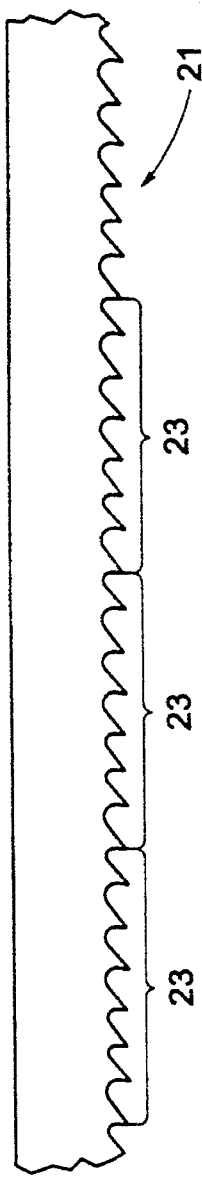
FIG. 1 is a partial view of a saw blade including recurring groups of teeth according to an embodiment of the present invention.
Figure 2:
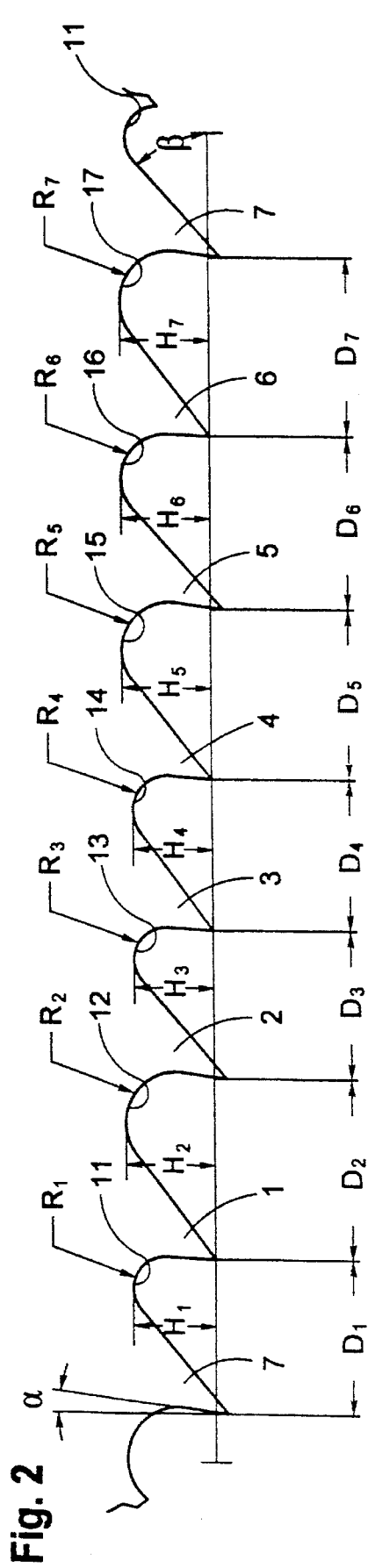
FIG. 2 is a side view of a group of teeth of a saw blade according to an embodiment of the present invention.

A saw blade 21 according to a preferred embodiment of the present invention is seen in FIG. 1 and has teeth arranged in recurring groups 23 of seven teeth 1–7. As seen in FIG. 2, a group 23 of seven teeth preferably includes three teeth 2, 5, 7 that are high teeth and four teeth 1, 3, 4, 6 that are low teeth. As seen in FIG. 2, one of the high teeth is preferably a raker tooth 7 with no angular set, and all other teeth 1–6 are set an equal amount. Thus six teeth 1–6 out of the seven total teeth cooperate to shape the final cut surfaces of a workpiece.

Figure 3:
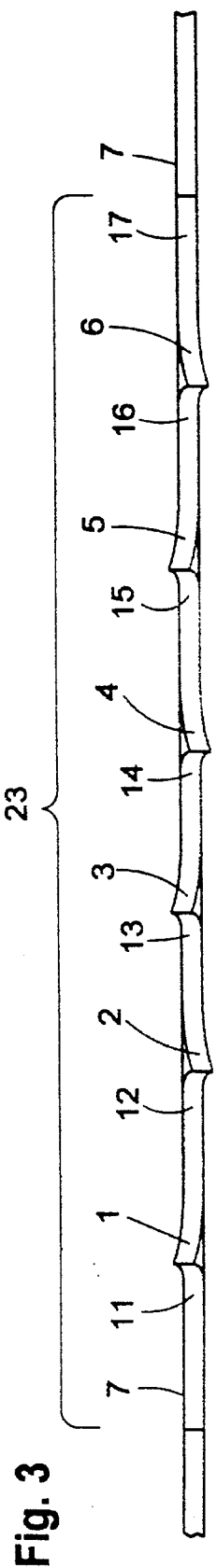
FIG. 3 is a top view of the group of teeth of FIG. 2.

The following description is with reference to FIGS. 2–3, generally. When tough materials are cut with low vertical feed and low cutting depth per tooth, only the high teeth 2, 5, 7 engage in cutting. To equalize the cutting load on the high teeth during cutting of tough materials at low vertical feed and low cutting depth per tooth, the high teeth are spread out with one or two of the low teeth between each two high teeth. The distance from one high tooth 2, 5, 7 to a preceding high tooth 7, 2, 5 preferably differs within a group 23 of any seven successive teeth to avoid self-induced chatter.

The depth of the gullets 11–17 between the teeth 1–7, respectively, is preferably varied to make more spacious gullets in front of the high teeth 2, 5, 7 to accommodate the larger amounts of chips produced by them. Furthermore, since the high teeth will cut thicker chips than the low teeth even when the vertical feed is so high that all teeth cut, of the radii $R_1$–$R_7$ of the gullets 11–17, respectively, it is advantageous that the gullet bottoms $R_2$, $R_5$, $R_7$ in front of the high teeth 2, 5, 7 be larger than the gullet bottoms $R_1$, $R_3$, $R_4$, $R_6$ in front of the low teeth 1, 3, 4, 6 to facilitate letting the thick chips curl before fracturing.

A group 23 comprises a plurality of teeth 1–7, and their corresponding immediately preceding gullere 11–17, respectively. The group 23 is defined, for purposes of discussion, as beginning after a straight high raker tooth 7 defining the end of a preceding group 23 of teeth. Preferably, the first tooth 1 is a low left set, the second tooth 2 a high right set tooth, the third tooth 3 a low left set tooth, the fourth tooth 4 a low right set, the fifth tooth 5 a high left set tooth, the sixth tooth 6 a low right set tooth and the seventh tooth 7 a high straight tooth without set. Of course, other arrangements, such as a mirror image having teeth arranged in the manner of low right, high left, low right, low left, high right, low left and high straight, would be equally useful. There are preferably an odd number of low teeth between the high straight tooth 7 and the high set teeth 2 and 5. There are preferably an even number of low teeth between the set high teeth 2 and 5. Distances from a point of any tooth in the group to a point of a preceding tooth of the same height are preferably different for all teeth in the group.

To avoid self-induced chatter, the distance from the point of one tooth to the preceding tooth, i.e., the pitch, is varied in such a way that, within any group of successive teeth, where each group preferably includes seven teeth, no pitches are equal, and no distances between two teeth set in the same direction are equal. According to a presently preferred embodiment, tooth shape and distance to the preceding tooth, in millimeters, for the teeth of a recurring group are: $D_1$ 5.1 mm; $D_2$ 6.05 mm; $D_3$ 4.8 mm; $D_4$ 4.91 mm; $D_5$ 5.68 mm; $D_6$ 5.6 mm; $D_7$ 5.96 mm. Gullet heights $H_1$–$H_7$, i.e., the height of the point of the tooth from the bottom of the gullet, for each of the gullets preceding each of the teeth 1–7 are preferably $H_1$ 2.650 mm; $H_2$ 2.910 mm; $H_3$ 2.540 mm; $H_4$ 2.600 mm; $H_5$ 2.820 mm; $H_6$ 2.750 mm; and $H_7$ 2.860 mm. Radii of the gullet bottoms $R_1$–$R_7$ are preferably $R_1$ 1.219 mm; $R_2$ 1.795 mm; $R_3$ 1.105 mm; $R_4$ 1.199 mm; $R_5$ 1.615 mm; $R_6$ 1.481 mm; and $R_7$ 1.775 mm. Heights of the high teeth 2, 5, and 7 are preferably 0.075 mm higher than heights of the low teeth 1, 3, 4, and 6. All of the teeth 1–7 preferably have a rake angle $\alpha$ of 6° and a relief angle $\beta$ of 37°.

All high teeth preferably have their points at one level to minimize differences in wear rates during cutting at low feed rates and thereby extend the useful life of the blade, and all low teeth preferably have their points at another level. All set teeth preferably have the same amount of set to facilitate forming a smooth surface on the workpiece.

It is, of course, possible to embody the invention in specific forms other than those described above without departing from the spirit of the present invention. The embodiments shown are merely illustrative and should not be considered restrictive in any way. The scope of the present invention is given in the appended claims, rather than the preceding description, and all variations and equivalents which fall within the range of the claims are intended to be embraced therein.

What is claimed is:

1. A saw blade, comprising:

a plurality of recurring groups of teeth, each tooth having a point; each group comprising one high straight tooth without set, an even number of high set teeth with points at a first level, half of the high set teeth being set to the right and half to the left, an even number, greater than the number of high set teeth, of low set teeth with points at a second level lower than the first level, half of the low set teeth being set to the right and half to the left, points of each tooth in the group being at a different distance from a point of a corresponding, immediately preceding tooth than a distance between a point of any other tooth in the group and a point of a corresponding, immediately preceding tooth, all set teeth in the group having the same amount of set, and no high tooth being immediately preceded by another high tooth, there being an odd number of low teeth between a high straight tooth and a high set tooth, and there being an even number of low teeth between two set high teeth, distances from a point of any tooth in the group to a point of a preceding tooth of the same height being different for all teeth in the group, distances from a point of any set tooth in the group to a point of a preceding set tooth of the same set being different for all set teeth in the group.

2. The saw blade according to claim 1, wherein each group includes one high straight tooth, two high set teeth, and four low set teeth.

3. The saw blade according to claim 1, wherein rake angles for each tooth are the same.

4. The saw blade according to claim 1, wherein relief angles for each tooth are the same.

5. The saw blade according to claim 4, wherein rake angles for each tooth are the same.

6. The saw blade according to claim 1, wherein gullets are formed between adjacent teeth, each of the gullets having a radiused bottom, radii at the bottom of the gullets all being different from one another.

7. The saw blade according to claim 1, wherein gullets are formed between adjacent teeth, each of the gullets having a gullet height from a bottom of the gullet to a point of a corresponding tooth, the gullet heights all being different from one another.

8. The saw blade according to claim 1, wherein each recurring group of teeth includes seven teeth.

9. A saw blade, comprising:

a plurality of recurring groups of teeth, each group of teeth including an unset high tooth, an even number of high set teeth with points at a first level, half of the high set teeth being set to the right and half to the left, an even number, greater than the number of high set teeth, of low set teeth with points at a second level lower than the first level, half of the low set teeth being set to the right and half to the left, a distance from any tooth to a preceding tooth in the group of the same height being different than a distance from any other tooth to a preceding tooth in the group of the same height, and a distance from any tooth to a preceding tooth in the group being different than a distance from any other tooth to a preceding tooth in the group, wherein there is an odd number of low set teeth between the high unset tooth and a high set tooth.

10. The saw blade according to claim 9, wherein distance from any tooth to a preceding tooth in the group of the same set are different.

11. The saw blade according to claim 9, wherein each group includes one high straight tooth, two high set teeth, and four low set teeth.

12. The saw blade according to claim 9, wherein there are an even number of low set teeth between any two high set teeth.

13. The saw blade according to claim 9, wherein gullets are formed between adjacent teeth, each of the gullets having a gullet height from a bottom of the gullet to a point of a corresponding tooth, the gullet heights for each gullet within the group all being different from one another.

14. The saw blade according to claim 9, wherein all of the high set teeth and all of the low set teeth have the same amount of set.

15. The saw blade according to claim 9, wherein rake angles for each tooth are the same.

16. The saw blade according to claim 9, wherein relief angles for each tooth are the same.

17. The saw blade according to claim 16, wherein rake angles for each tooth are the same.

18. The saw blade according to claim 9, wherein gullets are formed between adjacent teeth, each of the gullets having a radiused bottom, radii at the bottom of the gullets all being different from one another.

* * * * *